United States Patent
Romrell

(12) 
(10) Patent No.: US 6,396,805 B2
(45) Date of Patent: May 28, 2002

(54) SYSTEM FOR RECOVERING FROM DISRUPTION OF A DATA TRANSFER

(75) Inventor: David Alfred Romrell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/000,636

(22) Filed: Dec. 30, 1997

Related U.S. Application Data

(60) Provisional application No. 60/042,069, filed on Mar. 25, 1997.

(51) Int. Cl.[7] .............................................. H04L 12/26
(52) U.S. Cl. ...................................... 370/216; 709/224
(58) Field of Search ................................ 370/216, 218, 370/229, 230, 231, 352, 235, 236, 400, 241, 401, 242; 395/200.33, 200.68, 200.61; 709/200, 203, 224, 223, 217

(56) References Cited

U.S. PATENT DOCUMENTS

| | | | |
|---|---|---|---|
| 5,373,375 A | 12/1994 | Weldy | 358/523 |
| 5,517,612 A | 5/1996 | Dwin et al. | 395/166 |
| 5,544,320 A | 8/1996 | Konrad | 395/200.09 |
| 5,557,765 A * | 9/1996 | Lipner et al. | 380/21 |
| 5,631,907 A * | 5/1997 | Guarneri et al. | 370/474 |
| 5,673,322 A * | 9/1997 | Pepe et al. | 380/49 |
| 5,684,969 A | 11/1997 | Ishida | 395/342 |
| 5,701,451 A | 12/1997 | Rogers et al. | 395/600 |
| 5,706,434 A | 1/1998 | Kremen et al. | 395/200.09 |
| 5,724,556 A | 3/1998 | Souder et al. | 395/500 |
| 5,727,159 A | 3/1998 | Kikinis | 395/200.76 |
| 5,742,905 A | 4/1998 | Pepe et al. | 455/461 |
| 5,768,510 A | 6/1998 | Gish | 395/200.33 |
| 5,805,735 A | 9/1998 | Chen et al. | 382/239 |
| 5,974,461 A * | 10/1999 | Goldman et al. | 709/224 |
| 5,987,621 A * | 11/1999 | Duso et al. | 714/4 |
| 5,999,979 A * | 12/1999 | Vellanki et al. | 709/232 |

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

* cited by examiner

Primary Examiner—Dang Ton
Assistant Examiner—Brian Nguyen
(74) Attorney, Agent, or Firm—Kenyon & Kenyon

(57) ABSTRACT

A system for transparent recovery from a communications disruption during transmission of a data stream from a source computer to a destination computer is implemented in a method including the steps of determining a portion of the data stream that was successfully received by the destination computer and resuming the transmission from a point in the data stream immediately after the successfully received portion.

7 Claims, 4 Drawing Sheets

SYSTEM FOR RECOVERING FROM DISRUPTION OF A DATA TRANSFER

This application claims the benefit of the identically-titled U.S. Provisional Application No. 60/042,069, filed Mar. 25, 1997 by David A. Romrell and assigned to Intel Corporation, the disclosure of which is expressly incorporated herein by reference.

BACKGROUND OF THE INVENTION

1. Field of the Invention

The present invention relates generally to the field of computer networking, and in particular to a system in which a network device is configured to automatically recover from a communications disruption during transmission of a data stream.

2. Related Art

According to existing technology used for network data transfers, such as downloading information from the World Wide Web ("the Web"), the typical method for recovering from a communications disruption during a data transfer is to return an error to the end user. At this point the end user has the option of either reconnecting and restarting the download from the beginning, or giving up on the download altogether. Restarting the download has the inherent disadvantage of wasting all of the time previously spent receiving part of the data transfer. This is understandably frustrating to users, especially those with relatively low-speed connections to the Internet such as POTS (Plain Old Telephone System) or cellular connections.

One possible solution to this problem is to use checkpointed data transfers. Checkpointing is a technique used to keep track of data that has been successfully transmitted between two devices. If a failure occurs, the download resumes from the last checkpoint instead of from the beginning. Unfortunately, adding checkpointing functionality to the Internet would require software changes for existing Web browsers and the thousands of existing Web servers. Nevertheless, a protocol called HTTP 1.1, a relatively new version of the HyperText Transfer Protocol widely-used for communicating over the Internet, is a step in this direction. HTTP 1.1 provides a facility whereby a requesting device may designate a portion of a file to be downloaded by a server. In order to use this facility, however, both the source device and the destination device must be pre-configured to communicate with the new protocol.

Accordingly, there is a need for a system which provides the benefits of checkpointed data transfer, but without requiring changes to existing Internet infrastructure.

SUMMARY OF THE INVENTION

According to an embodiment of the present invention, a method for recovering from a communications disruption during transmission of a data stream from a source computer to a destination computer includes determining a portion of the data stream that was successfully received by the destination computer. Transmission is then resumed from a point in the data stream immediately after the successfully received portion.

DETAILED DESCRIPTION

Figure 1:
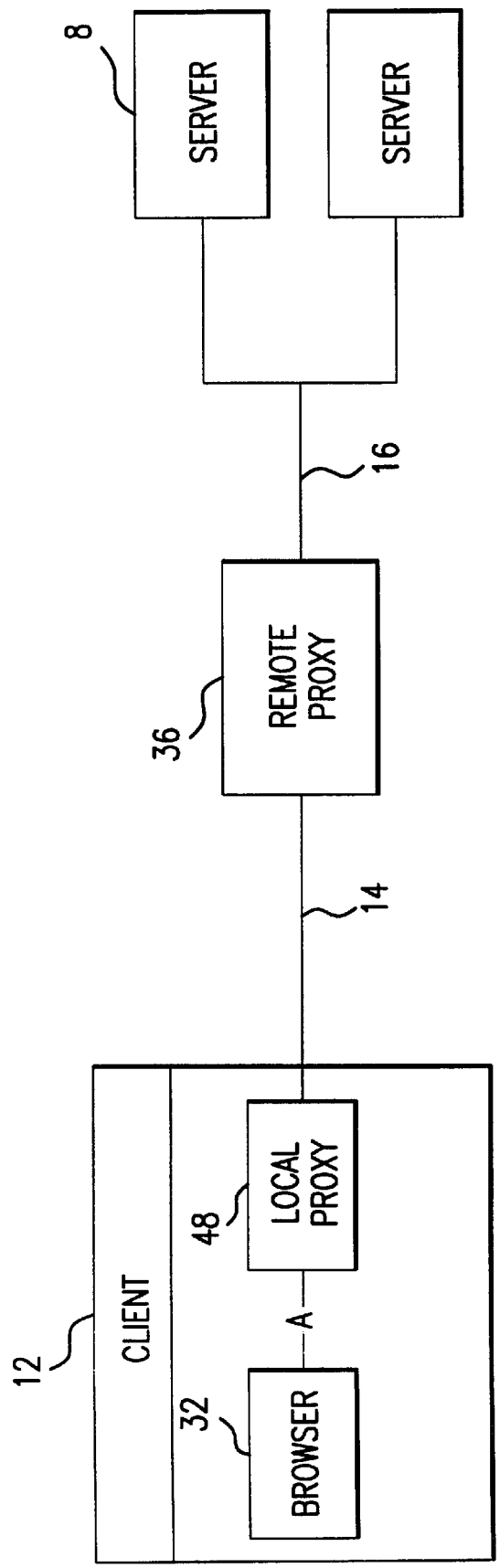
FIG. 1 is a schematic diagram illustrating a system for recovering from a communications disruption according to an embodiment of the present invention.

Embodiments of the present invention provide systems and methods for transparently recovering from a communications disruption during a transmission of data from a source network device to a destination network device. With reference to FIG. 1, according to a first embodiment a client device 12 having a browser 32 is configured to communicate with external network devices, such as content servers 8. In this embodiment, client device 12 includes a local proxy 48 that is configured to receive all network traffic from or to client device 12. In addition, a remote proxy 36 is arranged to receive all network traffic from or to client device 12. Client device 12, via local proxy 48, is coupled to remote proxy 36 by a first communications link 14, and remote proxy 36 is coupled to content servers 8 by a second communications link 16.

Figure 2:
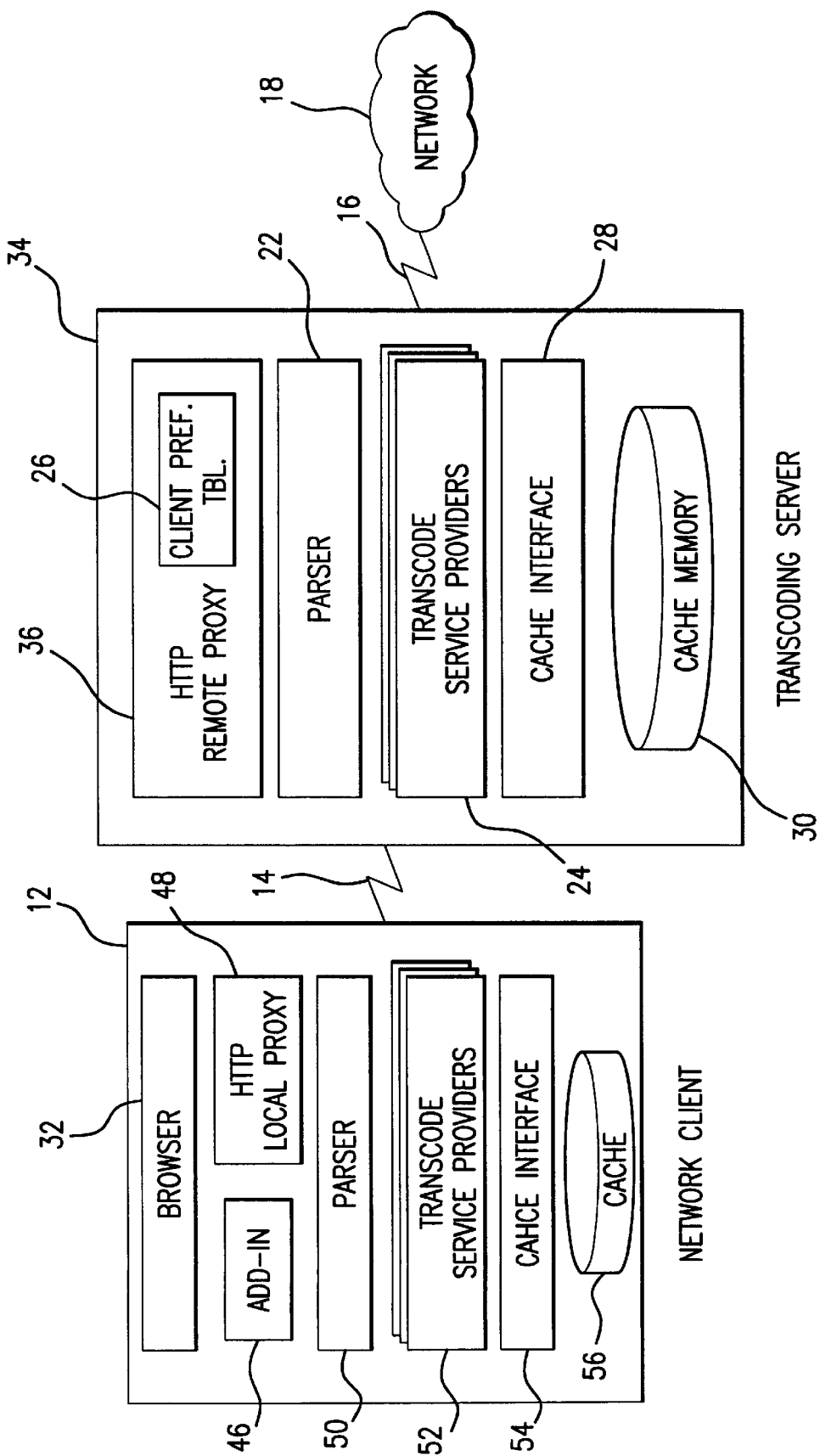
FIG. 2 is a schematic diagram illustrating a system for enhancing data access over a communications link in which embodiments of the present invention may be implemented.

Local and remote proxies such as those shown in FIG. 1 may be implemented, for example, as part of a system for enhancing data access over a communication link as illustrated in FIG. 2. In the arrangement of FIG. 2, a transcoding server 34 manages the transfer of data from the network 18 to network client 12. Network 18 may comprise, for example, the Internet. Network client 12 may be any computer having suitable data communications capability. Network client 12 communicates requests for information to, and receives information from, transcoding server 34 over a client/server communications link 14, and includes a browser 32, such as the Netscape Navigator v.3.0 browser (although the invention is not limited in this respect), which manages the presentation of data to a user. Transcoding server 34 communicates with computers resident on network 18 through server/network communications link 16. The respective communications links 14, 16 may comprise any suitable communications media known in the art.

In the particular arrangement shown in FIG. 2, transcoding server 34 includes a transcoder 20 having a parser 22 and a plurality of transcode service providers 24. Parser 22 is configured to act upon data received by transcoder 20, such as a request for a network object generated by a client device or a reply to such a request provided by a content server device. Parser 22 is responsible for selectively invoking one or more of transcode service providers 24 based upon a predetermined selection criterion.

Transcoding server 34 also includes an HTTP remote proxy 36, capable of accessing network 18 over server/network communications link 16. HTTP remote proxy 36 differs from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12, as is explained further below.

Transcoder 20 is coupled to HTTP remote proxy 36, and parser 22 manages the transcoding of data to be transmitted from transcoding server 34 to network client 12. To this end, parser 22 controls transcode service providers 24 to selectively transcode content based on a predetermined selection criterion. In this context, the term "transcode" refers to virtually any manipulation of data, including addition, deletion and modification. For example, one or more transcode service providers 24 may provide the capability to compress and/or scale different types of data content, such as image, video, or HTML (HyperText Markup Language).

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular arrangement, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Transcoding server 34 may also include a server-side cache memory 30 managed by a server-side cache interface 28. Server-side cache memory 30 may be used to store both original and transcoded versions of content for later transmission to network client 12 without the need to re-retrieve the content from Internet 18 or to re-transcode the content. Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this embodiment is through parser 22.

Server-side cache interface 28 may include the following calls:
  CreateEntry(URL, &Entry, ... );
  GetEntry(URL, &Entry);
  CreateStream(Entry, &StreamEntry, ... );
  GetStream(Entry, &StreamEntry, ... );
  CloseEntry(Entry);
  CloseStreamEntry(StreamEntry);
  GetProperties(Entry, &Properties, ... );
  SetProperties(Entry, &Properties, ... );
  Read(StreamEntry, &OutStream, ... );
  Write(StreamEntry, &InStream, ... ).

Unlike most cache memories, server-side cache interface 28 and server-side cache memory 30 enable maintenance of multiple representations of a given cached object, with descriptive information about each representation included in server-side cache memory 30. In addition, server-side cache interface 28 and server-side cache memory 30 serve as a synchronization point for multi-threaded accesses to cached objects. It should be noted that the illustrated arrangement does not require any particular configuration for server-side cache interface 28 and/or server-side cache memory 30, and functionality attributed to these components may be readily implemented in other system components.

The CreateEntry() call creates and returns a cache entry for a specified hypertext object. This call also creates an entry stream for an original version of the hypertext object. Similarly, the GetEntry() call obtains a cache entry for a hypertext object already existing in cache memory 30. Both the CreateEntry() and GetEntry() calls set locks on associated cached objects until a CloseEntry() call is invoked. Once a lock is set, the cached object will not be replaced or invalidated by cache interface 28, permitting one or more transcode service providers 24 to safely perform any required cache operations, such as object retrieval and/or storage.

After a cache entry is created or opened by a CreateEntry() or GetEntry() call, the CreateStream() or GetStream() calls may respectively create or open an extra stream entry for the cached object. Each extra stream entry is associated with a different transcoded version of the hypertext object, which may be retrieved or appended to by one of transcode service providers 24. Stream-based processing of cached objects makes it possible for transcoding server 34 to begin transmitting a transcoded version of a hypertext object to a requesting network client 12 even while transcode service provider 24 is appending additional transcoded content to that same version. Advantages of this stream-based processing include reducing user latency through incremental painting of objects and avoiding unnecessary idle time on client/server communications link 14, thereby providing users with a more responsive "feel."

The GetProperties() and SetProperties() calls retrieve and store information about cached objects, including information maintained by transcode service provider 24 used to determine transcoding properties and transcoding status of a cached object. Transcode service provider 24 may use such information, for example, to determine current compression progress for scaled data access and staged refinements.

The Read() call reads data from a specified cached object data stream. For example, transcode service provider 24 may invoke this call and tunnel stream data through HTTP remote proxy 36 directly to network client 12. The Write() call caches data from a new HTTP data stream. This call will append an incoming data stream received from, for example, a Web server or transcode service provider 24, to an opened cache stream which may be concurrently read using the Read() call.

In the arrangement shown in FIG. 2, parser 22 may include the following calls:
  GetObject(URL, InParams, &OutParams, &OutStream, ... );
  GetScaledObject(URL, InParams, &OutParams, &OutStream, Stage, ... );
  PutObject(URL, InParamStruct, &InStream, &OutParams, &OutStream, ... ).

As detailed below, parser 22 uses these calls to manage the provision of requested content to network client 12.

The GetObject() call is used to service non-enabled client requests, and returns a non-transcoded (i.e., original) version of a specified hypertext object. In this embodiment, transcoding server 34 assumes that each HTTP request has a unique thread that may be blocked until the request is satisfied. Accordingly, the GetObject() call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject() call is similar to GetObject(), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this arrangement, when network client 12 requests a hypertext object, HTTP remote proxy 36 uses either the GetObject() or GetScaledObject() call (depending on if network client 12 is capable of receiving scaled/transcoded datatypes) to retrieve the hypertext object from parser 22. If the hypertext object is not found, parser 22 uses the CreateEntry() call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObject() call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject() (or GetObject ()). This case will always result in a cache hit. This thread then works simultaneously with the separate thread in the PutObject() to tunnel data (either original or transcoded) from transcoding server 34 to network client 12.

Multiple-thread processing may be used to improve the efficiency of the arrangement shown in FIG. 2 by not waiting for a hypertext object to be received in its entirety by HTTP remote proxy 36, or added in its entirety to server-side cache memory 30, before beginning to send the object to network client 12. Another benefit of multiple-thread processing is that parser 22 may efficiently process requests for the same hypertext object from multiple network clients 12. The hypertext object need only be retrieved from network 18 once, and appropriate versions may be transmitted to such multiple network clients 12 concurrently.

Parser 22 may selectively invoke one of transcode service providers 24 based upon satisfaction of a predetermined selection criterion. Such selection criterion may comprise, for example, information contained in a header portion of a data packet received by transcoding server 34, such as a MIME type, a URL (Uniform Resource Locator), a last modified time indicator and so on. Alternatively, the predetermined selection criterion may comprise information contained in a data portion of such a data packet, such as particular content, key words, structures (for example, heading levels), and so on. Still further, the predetermined selection criterion may comprise a condition of the device on which transcoding server 34 is installed (for example, a current processing load), a condition of a device to which transcoding server 34 is coupled, or a condition of a communications link. Transcoding server 34 may provide the ability to dynamically update such predetermined selection criteria.

In the particular arrangement shown in FIG. 2, network client 12 is a so-called "enabled client," meaning it contains specialized software to support, for example, more sophisticated transcoding features than are provided by the above-described embodiments, or to perform some or all of the transcoding functions on the client side. As illustrated, network client 12 includes an HTTP local proxy 48 coupled to a client-side parser 50 which, similar to parser 22 of transcoding server 34, controls one or more client-side transcode service providers 52. Each transcode service provider 52 may be configured, for example, to transcode content before it is rendered to a user or to perform a counterpart transcoding function (e.g., decoding, decompression) with respect to a function performed by a corresponding transcode service provider 24 of transcoding server 34. As in transcoding server 34, network client 12 may include a client-side cache memory 56 managed by a client-side cache interface 54. Client-side cache interface 54 may be an already-existing facility supported by the operating system, such as WININET. Using an existing caching facility reduces the amount of software that is to be downloaded to network client 12 to implement such an arrangement, and also allows other applications, such as disconnected browsers, to share client-side cache memory 56.

HTTP local proxy 48, client-side parser 50 and client-side transcode service providers 52 (collectively, the client software) may be downloaded to network client 12 on demand. Alternatively, the client software could be distributed to users on a portable storage medium, such as a diskette or CD-ROM, or it may be preloaded on an off-the-shelf personal computer. In the illustrated arrangement, the client software is implemented separate from browser 32; however, the client software may also be integrated in browser 32.

The "enablement" provides network client 12 with expanded flexibility for rendering hypertext objects. As with so-called non-enabled clients, enabled network client 12 may receive a transcoded data stream from HTTP remote proxy 36 in a format that is already supported by the standard internal rendering software of browser 32 (e.g., JPG, GIF). This would be the case where, for example, the transcoding process involved adding or deleting text to the hypertext object. In addition, HTTP remote proxy 36 may transcode a hypertext object to a data stream having a new MIME type, such as where the transcoding process comprised scaling or data compression, in which case a client-side transcode service provider 52 could be provided to convert the data stream back to a MIME type supported by browser 32. For example, HTTP remote proxy 36 could transmit a file compressed using a non-standard, not well-supported but leading-edge compression algorithm to network client 12, and client-side transcode service provider 52 could uncompress the file back to its original format. This approach has the benefit of relieving HTTP local proxy 48 from having to provide a user interface, and eliminates restrictions imposed by limitations as to the data types supported by browser 32. In this way, the transcoding process can remain transparent to users, browsers and Web servers even when it involves changing content to different datatypes.

Yet another possibility is that enabled network client 12 includes one or more add-ins 46 specifically configured to transcode, render or playback content received by network client 12. Add-ins 46 may be implemented, for example, using Netscape plug-ins or ActiveX controls. Moreover, add-ins 46 may be installed as part of the client software, as illustrated in FIG. 2, or integrated with browser 32. Such add-ins 46 are beneficial in that they generally may be configured to permit a user to click on a specific object to obtain a different version (e.g., higher quality) representation. Add-ins 46 are also beneficial in that they appear to a user to be well-integrated with browser 32, and are easily upgradeable. Combinations of the above-described presentation facilities are also possible.

In the particular arrangement of FIG. 2, browser 32 is configured to send all HTTP requests through HTTP local proxy 48, thus allowing HTTP local proxy 48 to improve retrieval and rendering of requested hypertext objects. For example, when HTTP local proxy 48 receives an HTTP request from browser 32 for a hypertext object associated with a Web page, it passes the URL to client-side cache interface 54 to check whether a copy of the hypertext object already exists in client-side cache memory 56. If the hypertext object is cached, HTTP local proxy 48 passes the cached object to browser 32 for rendering. If the requested hypertext object is not cached, HTTP local proxy 48 transmits an HTTP request to transcoding server 34 for processing. HTTP local proxy 48 may use a custom Get() request for this purpose to enable transcoding server 34 to identify network client 12 as enabled. Performing the processing described above, transcoding server 34 will return a data stream for the hypertext object to HTTP local proxy 48.

Referring again to FIG. 1, the particular embodiment illustrated is directed to recovering from a failure in first communications link 14 and/or second communications link 16 during transmission of data, for example, from server device 8 to client device 12. This and other embodiments, however, may be used to recover from any break in the communications stream from server device 8 to client device 12. Communications link 14 may be any communications medium capable of carrying data transmissions including, but not limited to, POTS, cellular, packet radio, infrared, microwave, Ethernet, cable and satellite networks. The illustrated embodiment differs structurally from a typical prior art configuration by the addition of local proxy 48 and remote proxy 36, both of which play a role in recovering from a disrupted data transfer. In short, enhancements in these proxies enable failures in communications link 14, 16 to be detected and recovered from with little or no impact on the remainder of the system.

Figure 3:
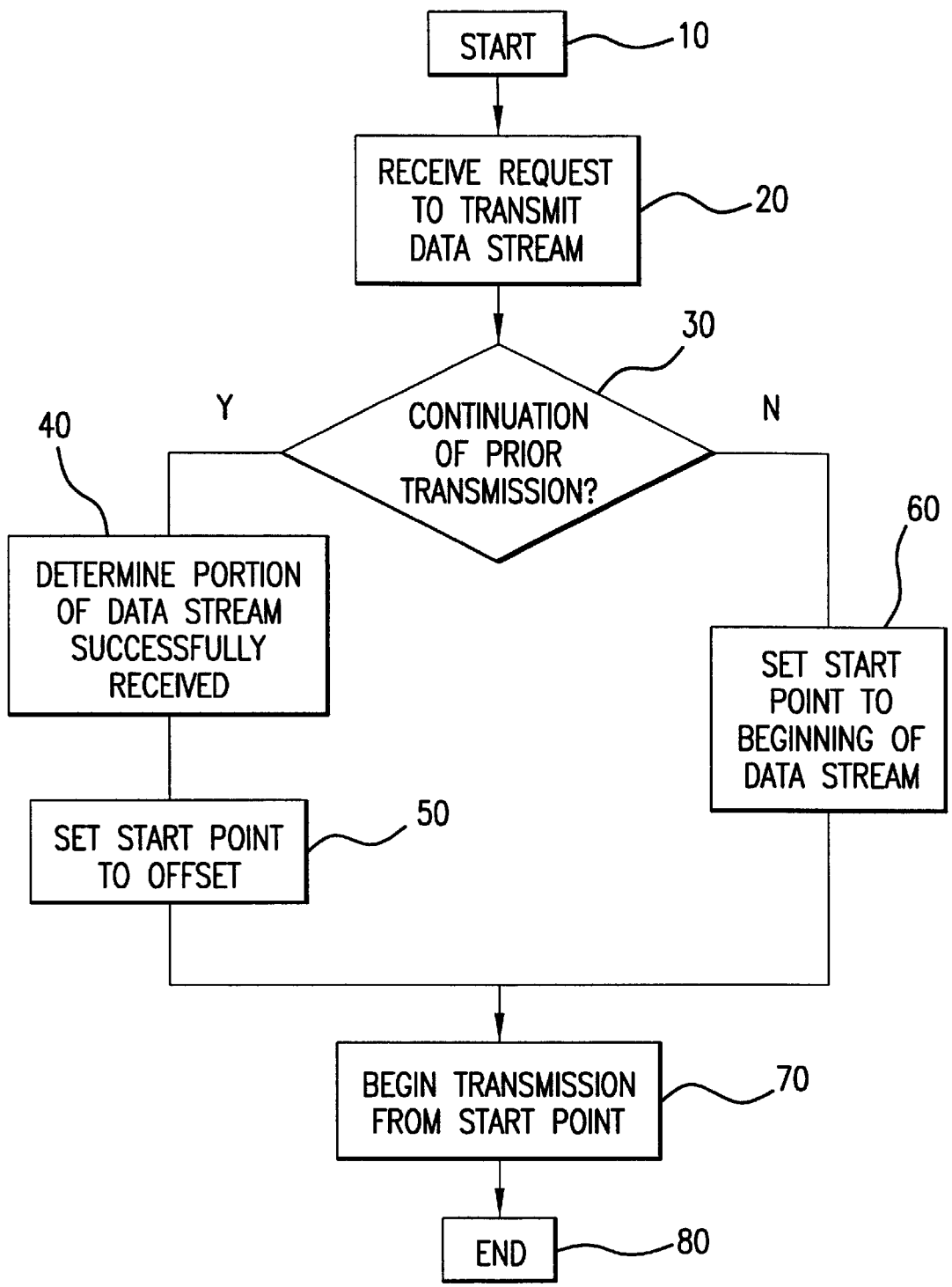
FIG. 3 is a flow diagram illustrating a method for recovering from a communications disruption according to an embodiment of the present invention.

A general recovery method according to another embodiment of the present invention is illustrated in the flow diagram of FIG. 3. This general method may be implemented, for example, as an executable software module installed in a network device, such as server device 8 in FIG. 1. According to this embodiment, processing begins upon receipt of a request to transmit a data stream (Step 20). As explained further below with reference to other embodiments, such a request may be generated, for example, by a destination device coupled to the network device, or even by the network device itself. Next, the network device determines whether the request corresponds to a previously disrupted transmission (Step 30). If so, the network device determines what portion of the requested data stream, if any, was successfully received by the destination device before the disruption (Step 40). The network device may then set a transmission start point to a position corresponding to an offset into the requested data stream equal to the successfully received portion (Step 50). If the request does not correspond to a disrupted prior transmission, the start point is set to the beginning of the data stream (Step 60). Transmission of the data stream to the destination device then begins from the start point (Step 70).

Referring again to the embodiment illustrated in FIG. 1, according to one particular implementation a system may be configured for so-called "automatic continuation" following a failure of communications link 14, 16. This implementation requires little interaction with the user of client device 12, and is transparent to browser 32. In a variation on this embodiment, local proxy 48 may optionally be configured to react to a disconnect by notifying the user with a dialog box, although such notification is not necessary to obtain the benefits of this embodiment. No indication of the detected failure is given through the open sockets to browser 32 (labeled "A" in FIG. 1). Where a dialog box is presented to the user and the user selects "automatic continuation," local proxy 48 will issue an enhanced request to remote proxy 36 for the data object that was being transferred when the disruption occurred. Unlike traditional protocols, which only request a data object, this enhanced request includes an indication of the number of bytes of the data object already received by local proxy 48. Remote proxy 36 then uses this indication to resume the data transfer from this offset. If the user does not choose to continue the data transfer, the system reacts like a standard proxy and closes the open sockets to browser 32. In such a case, all partially-received data is typically discarded. In yet another variation of this embodiment, local proxy 48 may be configured to always attempt automatic continuation, in which case there would be no need to provide the user with a dialog box.

According to another particular implementation, a system may be configured for so-called "deferred continuation." According to this latter implementation, the user is provided with an interface to checkpoint downloads at any time, not just because of a communications failure. If the user selects the deferred continuation option during a particular download, local proxy 48 checkpoints the connection by storing the partially-downloaded data object (deferred for later continuation) and returns an error to browser 32. This allows the user to, for example, browse elsewhere or disconnect until a later time. The interface further provides the user with the ability to choose when to continue the deferred download. The user may be given the option of resuming the download on demand, or the interface could alternatively permit the user to schedule the download to resume at a later point in time (such as at night). In the same manner described above with respect to automatic continuation, upon resumption local proxy 48 issues an enhanced request to remote proxy 36, causing remote proxy 36 to resume the download from an offset equal to the number of bytes previously stored by local proxy 48.

A consideration with respect to either of the foregoing approaches, but especially with respect to the deferred continuation approach, is the fact that the data object being downloaded may be updated at any time on server device 8. This potential problem may be addressed using a variation of the enhanced communications protocol just described. For example, when local proxy 48 issues an enhanced request to remote proxy 36, it may include in the enhanced request the HTTP/FTP (HyperText Transfer Protocol/File Transfer Protocol) header of the file represented by the partially-received data stream. Remote proxy 36 may then retrieve the data object from server device 8 and compare the header information to that received in the enhanced request to determine whether the data object has been updated. Such a determination may be made, for example, using the "Last Modified Time," "Content Length" or any other suitable fields likely to change when a data object is updated. If this check indicates that the data object has been updated, remote proxy 36 would then return a data stream representing the entire data object to local proxy 48; otherwise, remote proxy 36 would only return the remaining portion of the data stream. Remote proxy 36 could also return the header retrieved from server device 8 for use by local proxy 48 in verifying that the incoming data stream is in fact a continuation of the interrupted transmission. This header could also include a checksum for the data stream which local proxy 48 may use to ensure no errors were introduced during the recovery process. It should be noted that the foregoing references to HTTP/FTP structures are offered by way of example only, and are not intended to limit the scope of the present invention to any particular protocol.

Alternatively, local proxy 48 may perform, for example, a CRC (cyclic redundancy check) or other checksum-type process on the portion of the data object it received. It may then transmit the result to remote proxy 36 along with the size of the received portion. Remote proxy 36 may then re-retrieve the data object from server device 8 and perform an identical procedure on the same portion of the newly-retrieved data object. If remote proxy 36 arrives at the same result as that transmitted by local proxy 48, then it is not necessary for remote proxy 36 to re-transmit that portion of the data object; otherwise, remote proxy 36 will begin the re-transmission from the beginning of the data object.

Another consideration with respect to both the automatic and deferred continuation embodiments relates to storing a partial data object in a cache memory (not shown) coupled to local proxy 48. For this purpose, local proxy 48 may use a flag in its cache entry to indicate that the cached object contains only partial content. If client device 12 attempts to retrieve the cached object in the future, such as while browsing, local proxy 48 will recognize that it has only part of the desired data object in its cache. Local proxy 48 may then issue an enhanced request to either download the remaining portion of the data object or to download a complete, updated version as described above.

Figure 4:
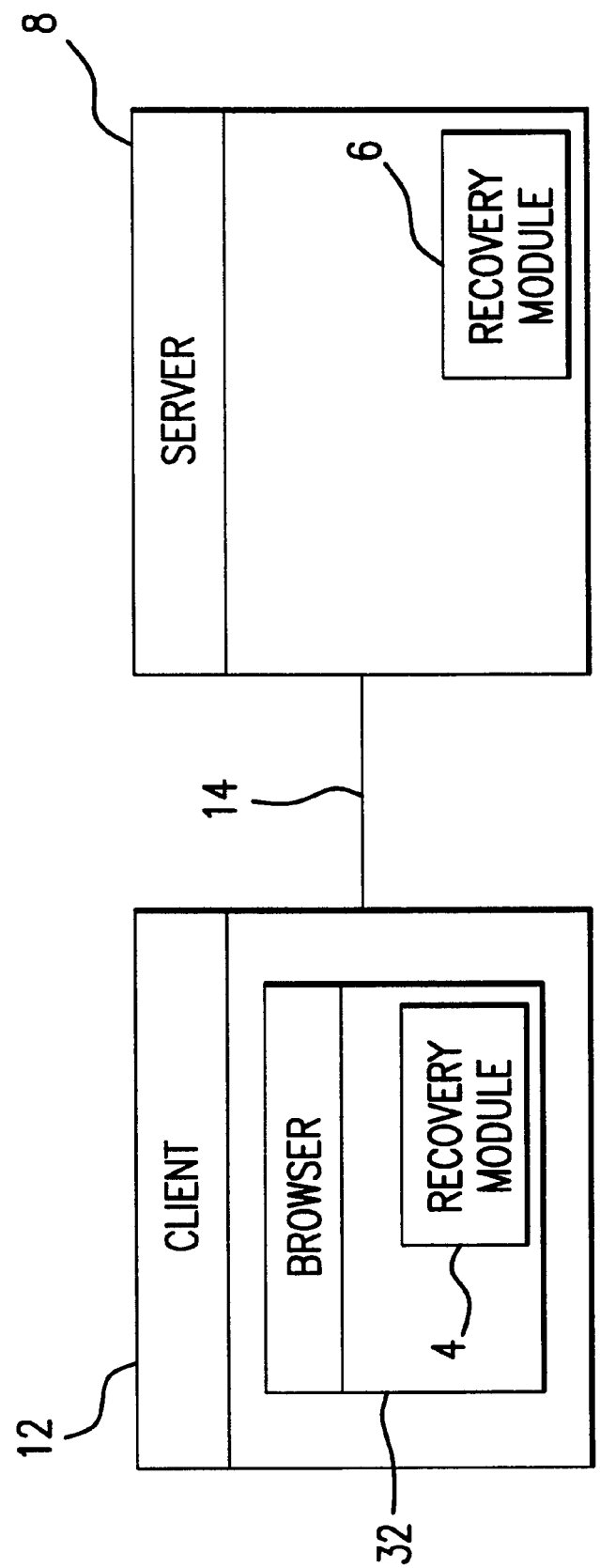
FIG. 4 is a schematic diagram illustrating a system for recovering from a communications disruption according to an alternate embodiment of the present invention.

In the embodiment illustrated in FIG. 1, client-side recovery processing is provided by local proxy 48 and server-side recovery processing is provided by remote proxy 36. In an alternate embodiment, illustrated in FIG. 4, server-side recovery processing may be provided by an executable software module 6 installed in server device 8. In a similar manner, client-side recovery processing may be implemented as an executable software module 4 installed in browser 32, or as a separate module within client device 12. Persons skilled in the art will recognize that various combinations of the proxy-based and non-proxy-based embodiments are likewise possible.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described with reference to embodiments for accessing data from a network such as the Internet, persons skilled in the art will recognize that it is equally applicable to other networking environments. For example, embodiments of the present invention may be used to checkpoint data transfers between a network client computer and an "intranet" (a secure corporate network modeled after the Internet architecture), and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, as alluded to above, embodiments of the present invention may be implemented without either a local proxy or a remote proxy, with the requisite functionality being provided, for example, in software running on a client device (for example, as part of a browser) and a server device. Still other embodiments may be implemented with a local proxy and a suitably-configured server device, or with a suitably-configured client device and a remote proxy. Still other embodiments may be implemented with enhanced network stacks which can detect a communications disruption and issue a request to download the remaining data. Persons skilled in the art will recognize from the foregoing detailed description that many other alternatives, modifications and variations are possible.

What is claimed is:

1. A system for recovering from disruption of a transmission of a data stream from a network server to a client device, said system comprising:

a proxy device arranged between the client device and the network server, the proxy device being configured to receive all traffic between the client device and the network server;

a first executable module coupled to the client device;

a second executable module coupled to the proxy device, said first executable module and said second executable module being in communication with one another;

said first executable module comprising instructions for selectively disrupting transmission of a data stream from said network server to said client device in response to a user request and for automatically resuming said transmission at a user-selected later time, said instructions for automatically resuming said transmission including instructions for generating a request to said second executable module to resume transmission of the data stream from said network server to said client device at the user-selected later time, wherein said request includes an indicator corresponding to a portion of the data stream that was previously received by said client device; and said second executable module comprising instructions for determining the portion of the data stream that was previously received by said client device, selectively retrieving some or all of a remaining portion of the data stream from the network server; and resuming transmission of the data stream from the proxy device to the client device beginning from a point in said data stream immediately following said previously received portion.

2. The system of claim 1, wherein the client device includes a browser, said first executable module comprising a component of said browser.

3. The system of claim 1, wherein the client device includes a browser, said first executable module being coupled to said browser.

4. The system of claim 3, wherein said first executable module further comprises a local proxy.

5. The system of claim 1, wherein said first executable module further comprises instructions for enabling a user of said client device to indicate the later time for resuming said transmission.

6. The system of claim 5, wherein said instructions for enabling the user to indicate the later time compromise instructions for presenting the user with a dialog box.

7. The system of claim 1, wherein said first executable module further comprises instructions for enabling a user of said client device to initiate said resumption of the transmission on demand.

* * * * *